(No Model.)

W. WHARTON, Jr.
CABLE RAILWAY.

No. 315,987. Patented Apr. 14, 1885.

Witnesses:
E. A. Happersett
Harry Smith

Inventor:
William Wharton Jr
by his Attorneys
Howson & Sons

UNITED STATES PATENT OFFICE.

WILLIAM WHARTON, JR., OF PHILADELPHIA, PA., ASSIGNOR TO WILLIAM WHARTON, JR., & CO., (LIMITED,) OF SAME PLACE.

CABLE RAILWAY.

SPECIFICATION forming part of Letters Patent No. 315,987, dated April 14, 1885.

Application filed February 3, 1885. (No model.)

*To all whom it may concern:*

Be it known that I, WILLIAM WHARTON, Jr., a citizen of the United States, and a resident of Philadelphia, Pennsylvania, have invented certain Improvements in Cable Railways, of which the following is a specification.

My invention consists of a cable-conduit constructed substantially in the manner described and claimed hereinafter, for the purpose of maintaining the slot at a proper width.

Figure 1:
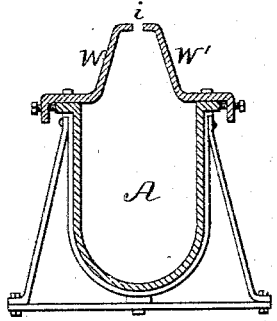
Figure 2:
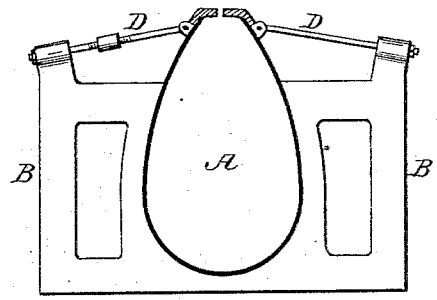
Figure 3:
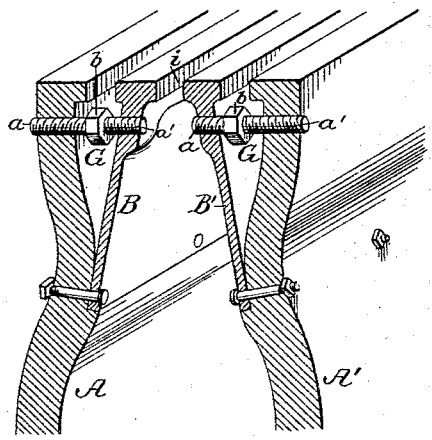

In the accompanying drawings, Figure 1 is a section of a conduit forming the subject of Letters Patent No. 281,562. Fig. 2 is a section of part of a conduit described in application "E," bearing even date herewith; Fig. 3, a sectional perspective view of the conduit which forms the subject of this present application, and Figs. 4 and 5 views illustrating modifications.

Before I proceed to describe my invention I will refer to Fig. 1, which represents in section the conduit for which Letters Patent No. 281,562 were granted to E. Samuel, July 17, 1883, this conduit consisting of suitably-supported longitudinal trough A, made in sections, and longitudinal side plates, W W', also made in sections, between which plates is the slot $i$, one or both of the plates being adjustable, so that the slot could be increased or diminished at pleasure. I should also refer here to an application for a patent (marked "E") bearing even date herewith for a conduit, one modification of which is shown in Fig. 2. In this case there are a series of frames, B, or other attachments to the conduit, and there are adjustable rods D, connecting the frames and conduit together, so that by adjusting the rods the width of the slot may be increased or diminished as circumstances may require, the pressure upon the sides of the conduit tending to bring the edges of the slot together.

Figure 4:
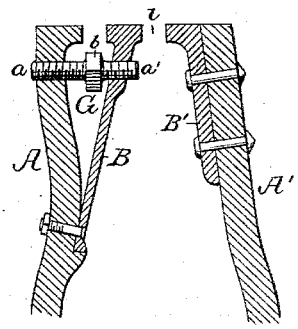
Figure 5:
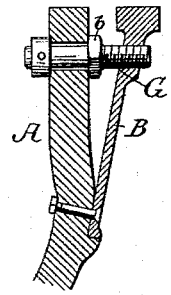

My present invention, which is illustrated in Figs. 3, 4, and 5, and which I will now proceed to describe, is so closely allied to that shown in Fig. 2 that it might perhaps have been included in application "E," bearing even date herewith. Structural differences, however, have suggested this separate application.

In Fig. 3 I have shown the upper part only of the conduit, A and A' being the opposite sides of the same. The longitudinal bars B B', between which is the slot $i$, and which are sometimes termed the "slot-bars," are extended downward between the opposite sides of the conduit, and are secured near their lower edges one to one side and the other to the opposite side of the said conduit. There is an adjustable connection between each slot-bar and the side of the conduit to which it is attached, this connection consisting, in Fig. 3, of a stud-bolt, G, having two threaded portions, $a\ a'$, one being a right and the other a left handed screw, and one part being adapted to a threaded opening in the side of the conduit and the other to a threaded opening in one of the slot-bars. There is a collar, $b$, on each stud-bolt, adapted to any appropriate wrench which may be applied by inserting it in the opening between the side of the conduit and slot-bar.

While the bar is of a substantial character, it is made to yield more readily than the sides of the conduit, and the consequence of turning the stud-bolts, which are separated at frequent intervals throughout the length of the conduit, will be the widening or contracting of the slot $i$, according to the direction in which the said bolts are turned.

The yielding slot-bar may be on one side only of the conduit, the other slot-bar being permanently secured to the opposite side, as shown in Fig. 4.

I do not desire to restrict myself to the adjustable connections shown. Each stud-bolt, for instance, may be confined by collars to the sides of the conduit, but so as to turn freely thereon, and have one threaded portion for entering the yielding slot-bar, as shown in Fig. 5. Other adjustable connections will readily suggest themselves to expert mechanics.

I claim as my invention—

The combination of a cable-conduit and yielding slot-bars secured to the said conduit on one or both sides of the same, with adjustable connections between the said conduit and bars, substantially as set forth.

In testimony whereof I have signed my name to this specification in the presence of two subscribing witnesses.

WILLIAM WHARTON, JR.

Witnesses:
HENRY HOWSON, Jr.,
HARRY SMITH.